United States Patent [19]
Weh et al.

[11] Patent Number: 5,957,468
[45] Date of Patent: Sep. 28, 1999

[54] COLLET DEVICE

[75] Inventors: Wolfgang Weh; Erwin Weh, both of Illertissen, Germany

[73] Assignee: Weh GmbH Verbindungstechnik, Germany

[21] Appl. No.: 09/068,909

[22] PCT Filed: Nov. 19, 1996

[86] PCT No.: PCT/EP96/05098

§ 371 Date: May 20, 1998

§ 102(e) Date: May 20, 1998

[87] PCT Pub. No.: WO97/19288

PCT Pub. Date: May 29, 1997

[30]     Foreign Application Priority Data

Nov. 20, 1995 [DE] Germany .................. 195 43 178

[51] Int. Cl.[6] ................................................. B23B 5/22
[52] U.S. Cl. ........................... 279/51; 279/2.04; 279/2.1; 279/146
[58] Field of Search ................ 279/2.02, 2.04, 279/2.1, 51, 58, 146

[56]         References Cited

U.S. PATENT DOCUMENTS

| 2,471,921 | 5/1949 | Ashdown | 279/146 |
| 3,599,998 | 8/1971 | Kiwalle et al. | 279/51 |
| 5,133,565 | 7/1992 | Schmidt | 279/2.04 |

*Primary Examiner*—Daniel W. Howell
*Assistant Examiner*—Monica Smith
*Attorney, Agent, or Firm*—Knobbe, Martens, Olson & Bear, LLP

[57]            ABSTRACT

The invention relates to a collet device, in particular for snap closure attachments for gaseous and/or liquid media which comprises a clamping plunger and a plurality of collets each with a connection end and a bearing end. The bearing ends of the collets are detachably suspended on the clamping plunger and the collets can be displaced axially with the clamping plunger using an actuating member. For simple and rapid replacement and assembly of the collets the invention proposes that the collet arrangement is linked to a fixing member movable in relation to the collet arrangement in order to block the bearing ends positively.

27 Claims, 8 Drawing Sheets

COLLET DEVICE

FIELD OF THE INVENTION

The invention relates to a spring chuck device, in particular for quick connection couplings for gaseous and/or liquid media.

BACKGROUND OF THE INVENTION

Spring chuck devices of this sort represent a quick and secure connection to e.g. gas bottles because of their easy handling, by means of which a time-consuming screwing off and on of the fitting is not required. The spring chucks engage thereby in an interlocking manner to the interior and exterior threads, to collar-, muff- and flange-connections etc.

A plug-in coupling for a pressure sealed connection to a device which has a complementary connection is described in EP 0 202 592. This plug-in coupling comprises a cylindrical housing with a piston which can be adjusted within it in an a axial direction and which has spring chucks projecting from the housing on one of its ends. When the piston is adjusted in an axial direction relative to the housing, the spring chucks are expanded radially or pressed together via a ramp or diagonal surface arrangement between the housing and the piston according to the direction of movement. In a first embodiment form the piston and the spring chucks are designed in one piece. This demands a thin transition area between the piston and the spring chucks for the spring chucks to be able to be slid inwards or outwards via the ramp arrangement in a resilient manner. Even with larger sizes of device, this transition must be relatively thin so that the force needed for adjustment does not become too great. With frequent load changes, however, this thin transition is particularly prone to fatigue fracture. In addition, in order to replace the spring chucks, the entire plug-in coupling construction must be dismantled.

The disadvantages of the integral embodiment form are compensated for a by a further embodiment form in EP 0 202 592, in which the spring chucks and the piston constitute separate components and the spring chucks are hooked onto the piston. The spring chucks and the tension piston can be pinned together also for additional security. As a result the spring chucks can be replaced without changing the tension piston and can be fitted individually to the respective counter connection. However, in this embodiment form at least the front portion of the housing must be dismantled also, e.g. unscrewed for the spring chucks to be replaced.

SUMMARY OF THE INVENTION

From DE-A 24 28 646 furthermore, a quick connection for pipes with pressure reservoirs is known in which a shell is directed onto an outer sleeve of one pipe end. In the interior of the axially adjustable shell two-armed tilting levers are arranged for engaging in an interlocking manner with a fitting. The tilting levers have a groove on their inside in which a disc, serving as a counter spring for a spring is located and which is coupled with a collar disc and hence with the shell via the spring. In order to be able to replace the tilting levers, the sliding shell must hereby be likewise dismantled.

Consequently, the object underlying the invention is to create a spring chuck device of the type described at the beginning which makes possible a simpler and quicker replacement and assembly of the spring chucks.

An aspect of the invention involves a spring chuck device comprising a tension piston and several spring chucks. The spring chucks each having a connection end and a bearing end being secured detachably with their bearing ends to the tension piston and being axially adjustable together with the tension piston by means of an actuation element. The tension piston and the spring chucks form a spring chuck arrangement which is coupled to a moveable fixing element relative to the spring chuck arrangement for catching the bearing ends in an interlocking manner.

Accordingly a moveable fixing element is provided on a spring chuck arrangement so that in its stopping position it supports or encompasses in a interlocking manner the bearing ends of the spring chucks relative to the spring chuck. The fixing element can thereby be moved out of engagement with the spring chuck ends, by means of which the spring chucks can be unhooked from the hook connection with no effort and can be removed at the front side without thereby having to dismantle the housing of the spring chuck device.

Advantageous developments are the subject of the subclaims, the fixing element is adjustable preferably in an axial direction relative to the spring chuck arrangement so that it can be moved out of its stopping position e.g. by means of a mandrel introduced from the front side. However it is also possible thereby that the fixing element can be movable in a radial direction relative to the spring chucks, hence e.g. by means of a fixing element with a folding form. The fixing element is arranged particularly hat-shaped in the inner space of the spring chuck device or shell-shaped around the spring chuck arrangement. The stopping surface of the fixing element, which contains a bearing end of the spring chucks in an interlocking manner, has a square graduated or preferably a diagonal shape as a result of which locking in the exchanged spring chucks during the changing operation is simplified. Furthermore the fixing element is kept in its stopping position by means of a spring elastic element particularly a pressure coil spring.

With the spring chuck device according to the invention the spring chucks can be replaced quickly by pushing back the fixing element relative to the spring chuck arrangement and hence a faster accommodation to very different forms of connection can also be achieved. Equally it is possible to use these compact, easy to handle spring chuck devices in tools and indeed as a tool spring chuck device in the interior of a machining spindle or as a tool holder in a tool replacer or tool magazine.

BRIEF DESCRIPTION OF THE DRAWINGS

Subsequently, the invention is explained in more detail and described with reference to the enclosed drawings which show.

DETAILED DESCRIPTION OF THE INVENTION

Figure 1:
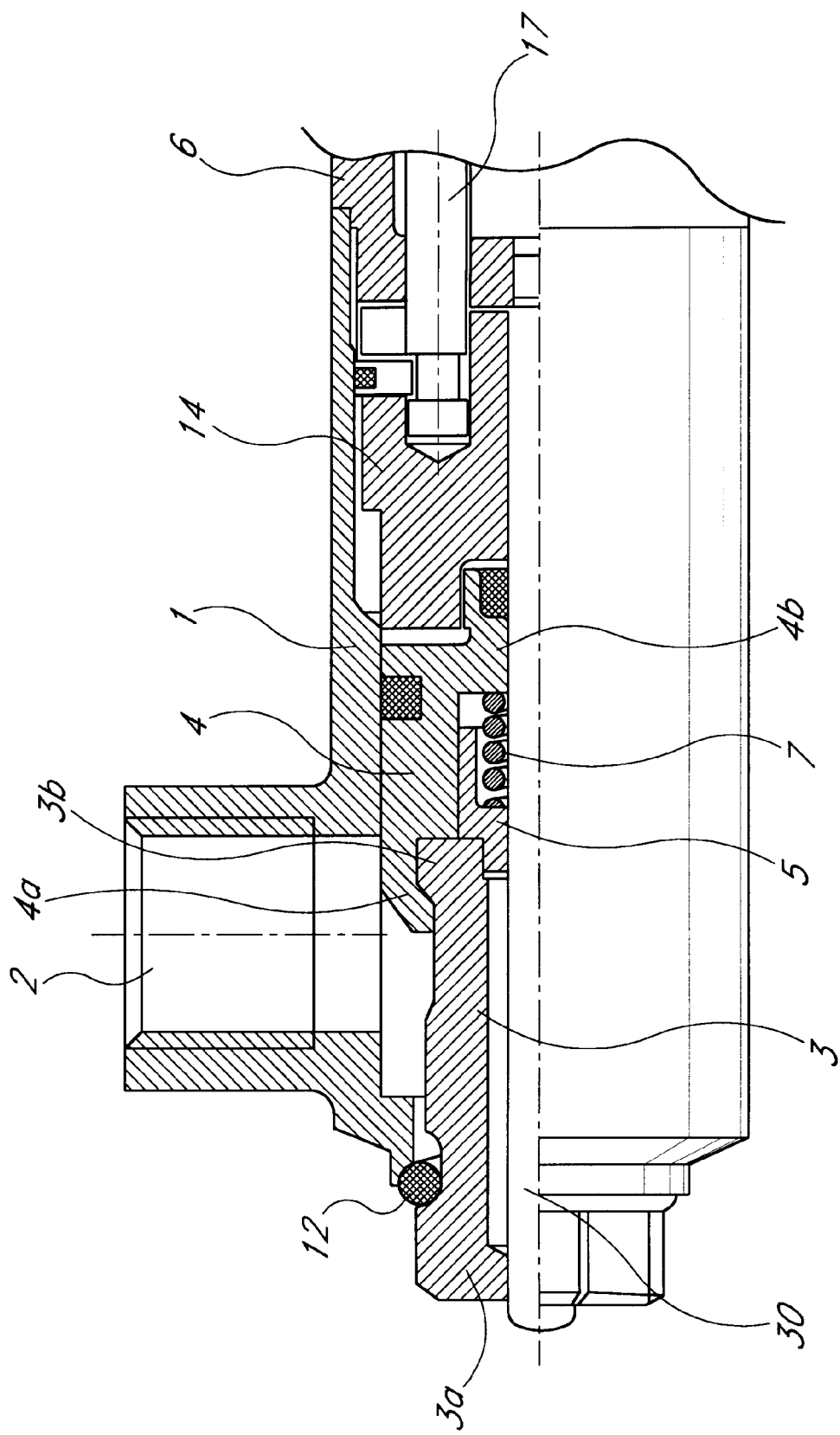
FIG. 1. A spring chuck device in the engaged position of the spring chucks with a hat-shaped, central interior fixing element.

The invention is described subsequently in the example of a fast connection for gaseous and/or liquid media, but it can equally be used in tool machines. FIG. 1 shows a spring chuck device in a fast connection coupling which has a front housing part 1 and a rear housing part 6, but which can also consist of an integral housing shell. The front housing part 1 comprises a spring chuck arrangement 3,4, which consists of several spring chucks 3 and a tension piston 4. The spring chucks 3 are coupled via the tension piston 4 with a front part 14 of an actuation device which is contained essentially by a rear housing part 6. The front housing part 1 is provided in the fast connection coupling shown here with an inlet or outlet opening 2 for liquid or gaseous media. On its front end 4a facing towards the spring chucks 3, the tension piston 4 has a recess into which a complementary rear bearing end 3b of the spring chucks 3 facing towards the tension piston 4 engages in an interlocking manner. The front connection end 3a of the spring chucks 3 is provided with an outer thread in this embodiment example but it can also consist of an inner thread, a bulb, a groove and other profile shapes, which make possible an interlocking profile engagement with a fitting, e.g. a nipple.

Figure 3:
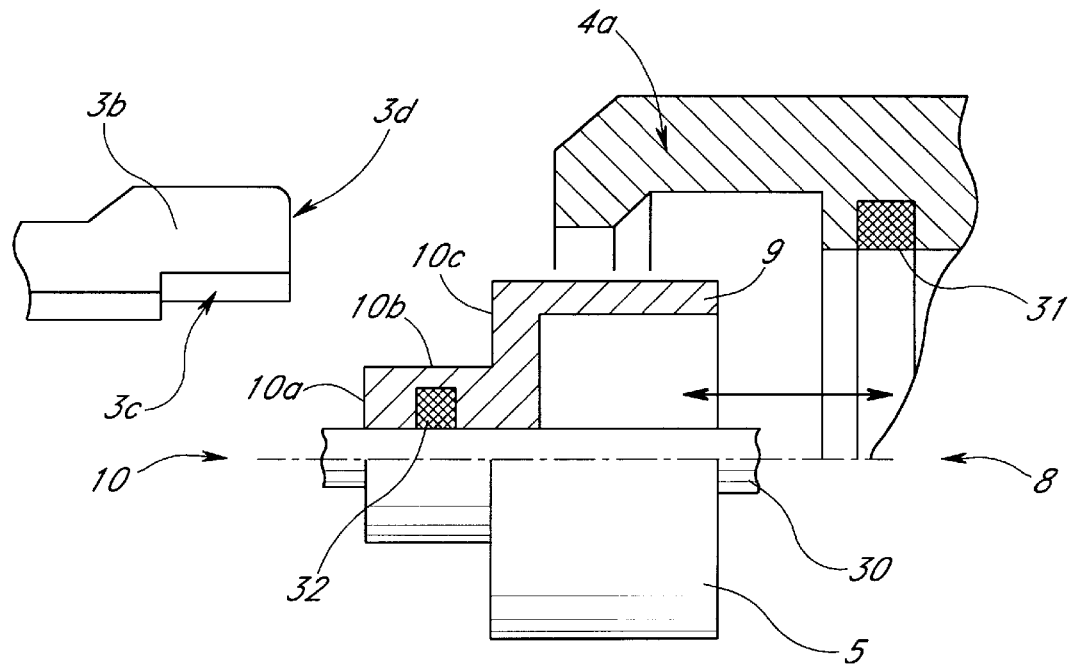
FIG. 3. A first embodiment form of a hat-shaped fixing element in extended representation.

In the inner space of the spring chuck arrangement 3,4, a hat-shaped fixing element 5 is arranged which holds the rear bearing end 3b of the spring chucks 3 in the front end 4a of the tension piston 4. The fixing element 5 thereby guarantees an interlocking arrangement of the spring chucks 3 in the tension piston 4 and has a collar 9 on its rear side 8, said collar containing a spring elastic element 7 in its interior as is shown in FIG. 3. For back-side or rear side subsequently, the side lying on the right-hand side of the plane of projection is always meant and, for front or fore-side correspondingly, the side lying on the left-hand side of the plane of projection is meant.

The spring elastic element 7 is preferably a pressure spring which activates and pretensions the fixing element 5 into the stopping position (as is shown in FIG. 1) towards the spring chucks 3, and the fixing element 5 is arranged adjustably relative to the spring chuck arrangement 3,4. Instead of a pressure spring a cup spring stack, a rubber spring or a pneumatic spring etc. can also be used. The spring elastic element 7 is thereby supported on the stepped rear part 4b of the tension piston 4.

The fixing element 5, the rear part 4b of the tension piston 4 and the front part 3a of the spring chucks 3 are arranged in this embodiment example around a stationary guiding rod 30 projecting centrally into the front housing part 1 and are supported on said guiding rod when moving axially. The guiding rod 30 is secured in the second housing part 6. A spring chuck device according to this invention may, however, also be designed without a guiding rod 30. Furthermore, between the tension piston 4 and the front housing part 1 and also between the guiding rod 30 and the tension piston 4 respectively, a sealing element which is drawn in black is provided to ensure a corresponding seal between the opening 2 and the connection end 3a or the fitting when fluid is being conducted.

FIG. 1 shows the spring chucks 3 in their radially expanded engagement position with a fitting which is not shown in more detail. If an actuation device, which is not shown here in great detail, is actuated e.g. via a lever or hoop, an actuation pin 17 is displaced, relative to the rear housing part 6 in an axial direction to the left, i.e. in the direction of the left-hand side of the contour, which actuation pin is guided through a hole in the rear housing part 6 and connected to the front part 14 of the actuation device, which is once again coupled to the rear part 4b of the tension piston 4.

Figure 2:
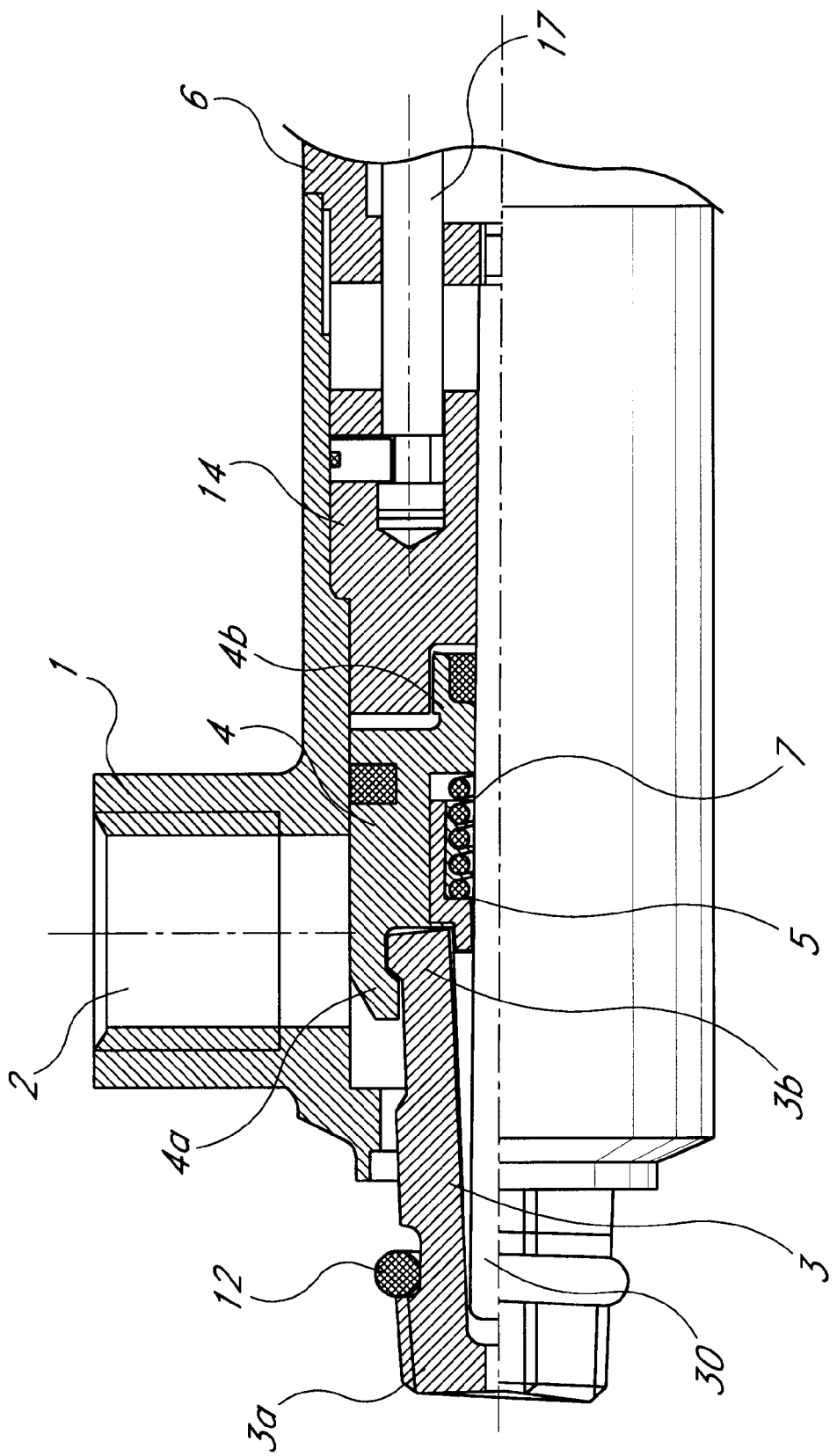
FIG. 2. A spring chuck according to FIG. 1 in the released position of the spring chucks.

The spring chuck arrangement 3,4 is hence moved likewise in an axial direction to the left together with the fixing elements relative to the front housing part 1 and the guiding rod 30, as is shown in FIG. 2. The spring chucks project then with their front connection ends 3a over the front edge of the guiding rod 30 and are pressed together by means of an elastic O-ring 12 arranged around them. In order that the spring chucks 3 can carry out this radial movement, the fixing element 5 must yield at the same time marginally towards the right contour in an axial direction, i.e. be movable relative to the spring chuck arrangement 3,4, without however releasing the stopping position of the spring chucks 3. This minimal axial moveability of the fixing element 5 is assured by the spring elastic element 7, In the radially compressed position, the front connection end 3a of the spring chucks 3 can be introduced into a fitting with an inner thread and then, by renewed actuation of the actuation device, be brought back in the opposite direction again into the expanded engagement position shown in FIG. 1. In this engagement position, the sealing ring 12 also performs the sealing which is shown in FIG. 1 against the media escaping into the surrounding area.

FIG. 3 shows the first embodiment example of the hat-shaped fixing element 5 also used in FIGS. 1 and 2 in enlarged, expanded representation, said fixing element having a hole extending in an axial direction for receiving the guiding rod 30. On its front side 10, the fixing element 5 has a square, graduated shape 10a, 10b, a square stopping and receiving surface 10b, 10c, for the inner edges 3c,3d, of the spring chucks 3 forming bearing ends. As already mentioned above, the fixing element 5 has a collar 9 on its rear side, which contains a spring elastic element 7 in its interior. Furthermore, as is shown in FIG. 3, sealing elements 31,32, may also be provided between the tension piston 4 and the fixing element 5 or between the fixing element 5 and the guiding rod 30. These sealing elements 31,32, prevent the medium penetrating into a space (see FIG. 1) which is surrounded by the fixing element 5, the tension piston 4 and the guiding rod 30 and hence the axial displaceability of the fixing element 5 is restricted or blocked. The sealing elements 31,32, may therefore be used according to choice in the tension piston 4, the fixing element 5 or the guiding rod 30.

Figure 4:
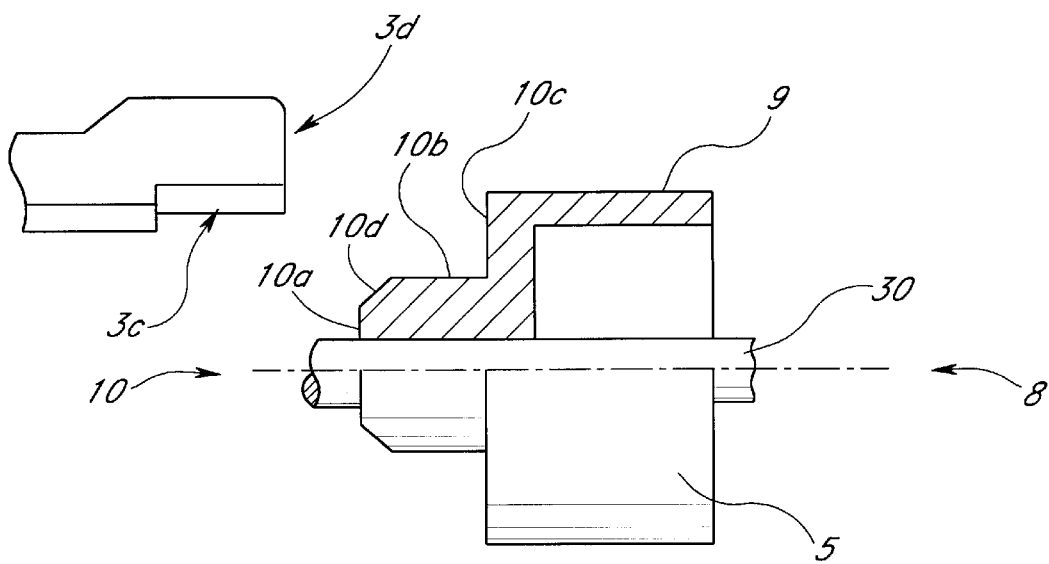
FIG. 4. A second embodiment form of a hat-shaped fixing element in extended representation.

FIG. 4 shows a modified embodiment form of the fixing element 5, shown in FIG. 3, which likewise has a hole extending in an axial direction, for the guiding rod 30. The fixing element 5 has a diagonal shape 10d on its front side 10 which facilitates the insertion of the spring chucks 3 into the tension piston 4 by sliding over this diagonal guiding surface. The further features of this embodiment example are identical to those in FIG. 3, for which reason they are not gone into in greater detail.

Figure 5:
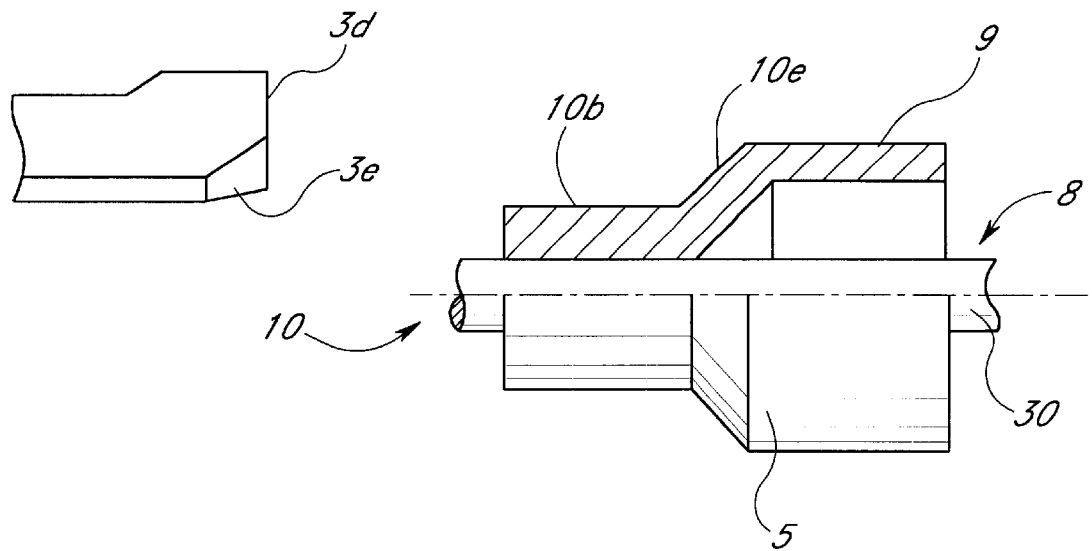
FIG. 5. A third embodiment form of a hat-shaped fixing element in extended representation.

The embodiment shown in FIG. 5 differs from that in FIG. 3 by virtue of the fact that the fixing element 5 has, on its front side 10, a diagonal stopping and receiving surface 10b, 10e, for a correspondingly shaped inner edge 3d, 3e, of the spring chucks 3. Here too, the diagonal arrangement supports a more flexible insertion of the spring chucks 3 into the tension piston 4. The further characteristics of this fixing element 5 are identical to those in FIGS. 3 and 4.

Figure 6:
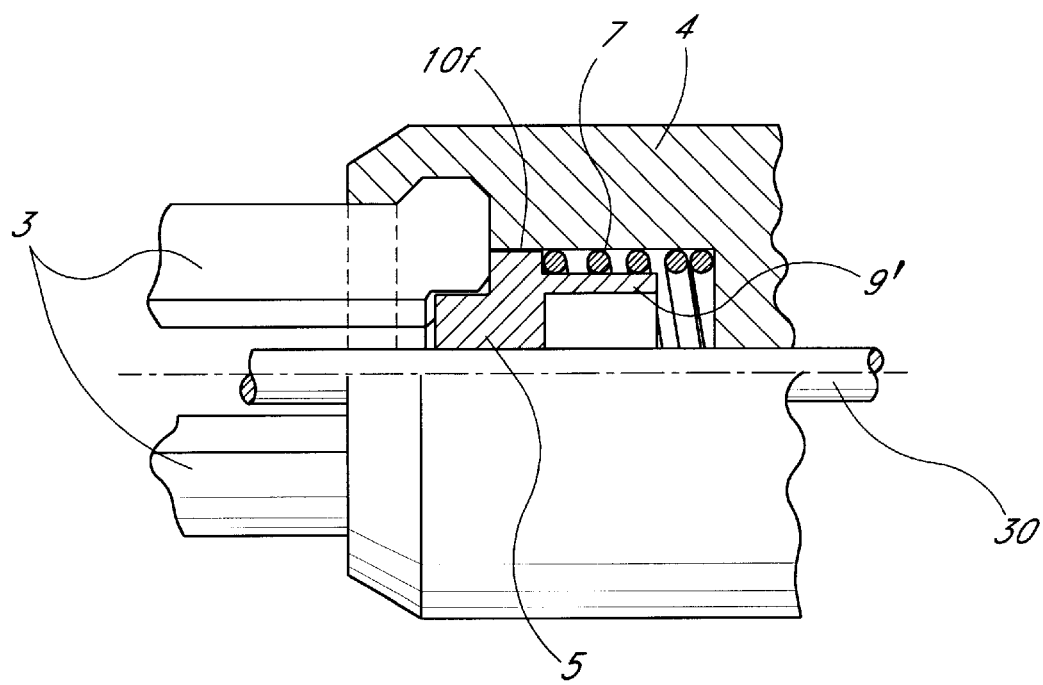
FIG. 6. A spring chuck device with a fourth embodiment form of a hat-shaped fixing element in the stopping position.

FIG. 6 shows a spring chuck device with a hat-shaped fixing element 5, which likewise has a hole for the guiding rod 30 and on its rear side 8 has an encompassing graduation 9' with a smaller circumference. In this embodiment form, it is possible to arrange a spring elastic element 7 between the tension piston 4 and the fixing element 5. An arrangement of this sort indeed causes a better guide and support for the spring elastic element 7 at the expense, however, of the guiding surface between the fixing element 5 and the tension piston 4. However by widening the web 10f the latter can be counteracted. Of course all the above described embodiments of the fixing element 5 may be provided with either a graduation 9' or a collar 9 according to choice.

Figure 7:
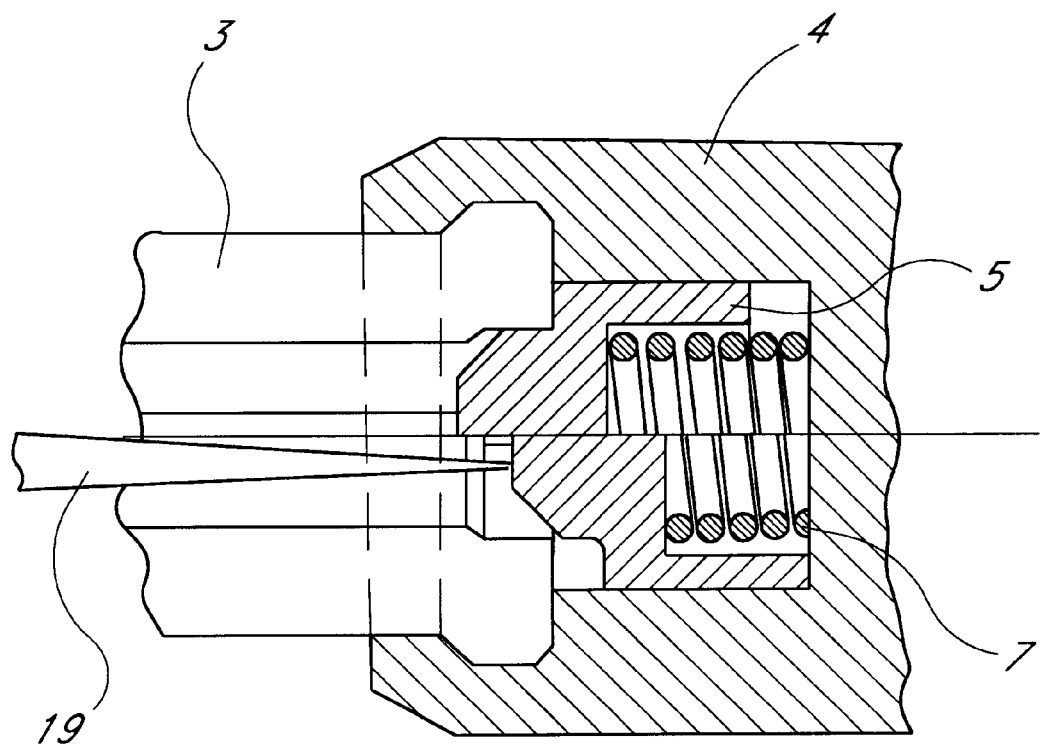
FIG. 7. A spring chuck device with a fifth embodiment form of a hat-shaped fixing element in a halved section in stopping position (upper half) and in released position (lower half)
Figure 8:
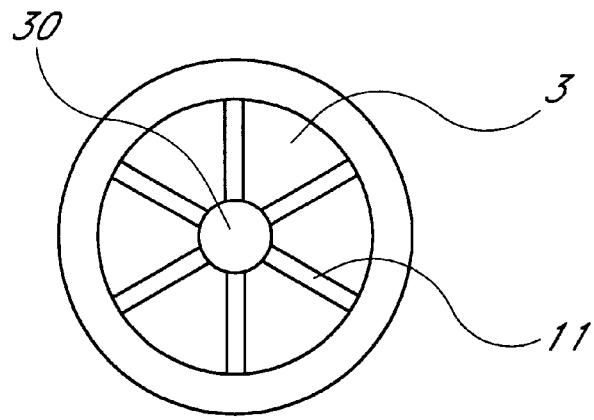
FIG. 8. A front view of the spring chucks of a spring chuck device.

FIG. 7 shows a further embodiment example of a fixing element 5 which corresponds to the embodiment form shown in FIG. 4 apart from the non-present hole in the axial direction. While the part lying above the central line in FIG. 7 shows the fixing element 5 in stopping position i.e. in engagement or in an arrangement to the spring chuck ends, the part of FIG. 7 lying beneath the central line shows the fixing element 5 displaced out of its stopping position by means of a mandrel 19 in an axial direction relative to the spring chuck arrangement 3,4. As can be seen from FIG. 7, when the fixing element 5 is in this position the spring chucks 3 can be removed effortlessly from the tension piston 4 and be drawn forwards (to the left here) out of the housing part 1. The mandrel 19 is thereby introduced from the front via the holes 11 (c.f. FIG. 8) through between the spring chucks 3 or centrally into the spring chuck device 3,4. Thereby, the spring chucks 3 can be pulled out individually or together. New spring chucks 3 can be installed e.g. with another connection profile quite simply by pushing them in axially at the front side of the housing part 1, the fixing element 5 compensating for the force of the spring 7 and locking at the front end 4a of the tension piston 4 with the bearing end 3b respectively.

A spring chuck 3,4, of this type which is designed without a guiding rod 30, can also be provided with a central mandrel fitted integrally to a fixing element 5 in order to save an additional tool of a mandrel-shaped form e.g. a slim screwdriver for pushing back the fixing element 5. Furthermore, it is also possible as an additional variant to provide a fixing element 5 from the rear housing part 6 with an integrally designed or mountable, rod-like extension for releasing the fixing element 5 from its stopping position with a tensile load, i.e. pulling from the bearing ends 3b. Releasing from the stopping position by pulling or pushing can also be achieved by means of a twisting movement with the aid of a crank drive.

Figure 9A:
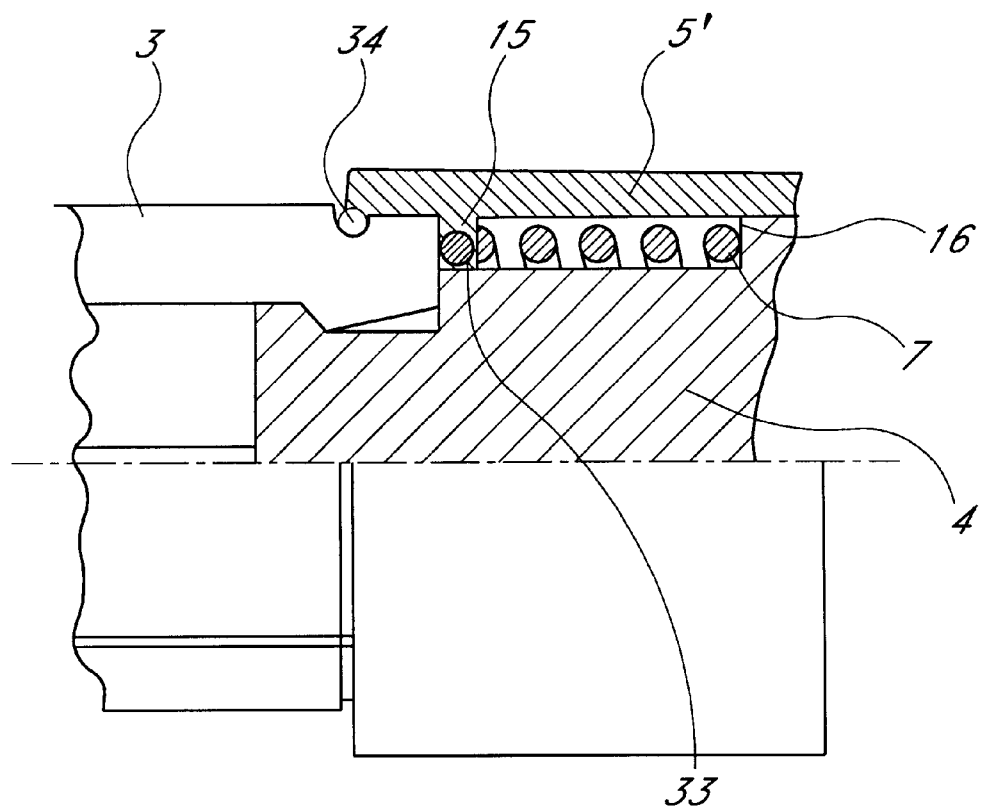
FIGS. 9a, b. A spring chuck device with a first embodiment form of a shell-shaped, outer fixing element.
Figure 9B:
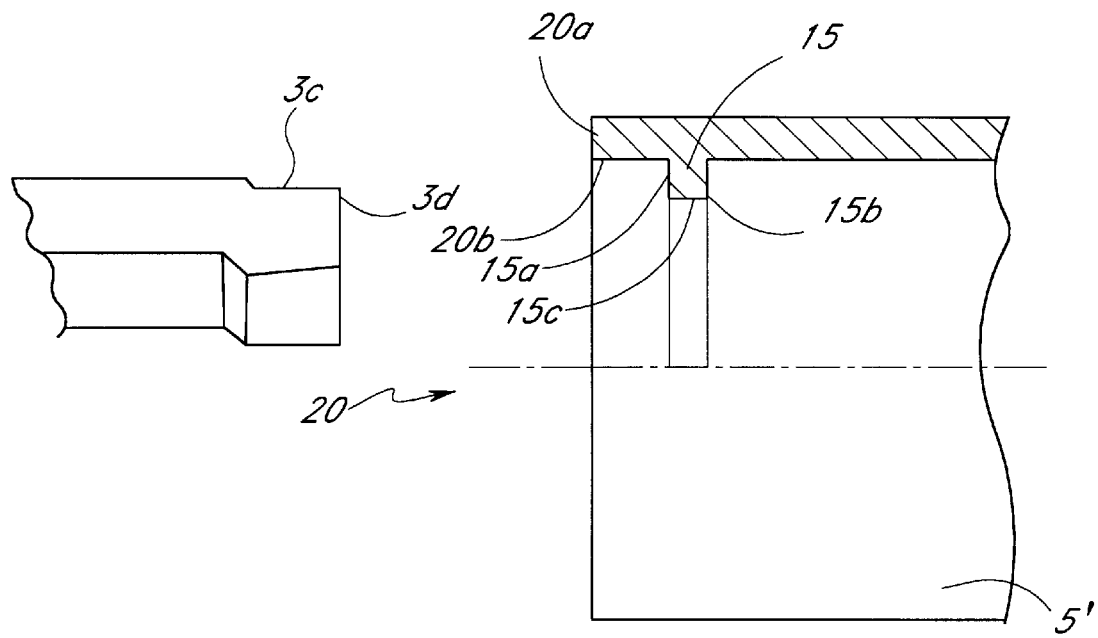

FIGS. 9a and 9b show a spring chuck device 3,4, with a shell-shaped fixing element 5', which is arranged around the spring chuck device 3,4, and which has a square shape 20a, 20b, at its front side 20. In addition, the fixing element 5' comprises another encompassing stopping step 15 which is pointing inwards and also a square stopping and receiving surface 15a, 20b, which contains an outer edge 3c,3d, of the spring chuck device 3 in an interlocking manner. According to FIG. 9a, between the rear side 15b of the stopping step 15 of the fixing element 5' and a stopping step 16 of the tension piston 4, a spring elastic element 7 is arranged, which is preferably a pressure spring and forces the fixing element 7 into its stopping position, shown in FIG. 9a, with the spring chucks 3.

Figure 10:
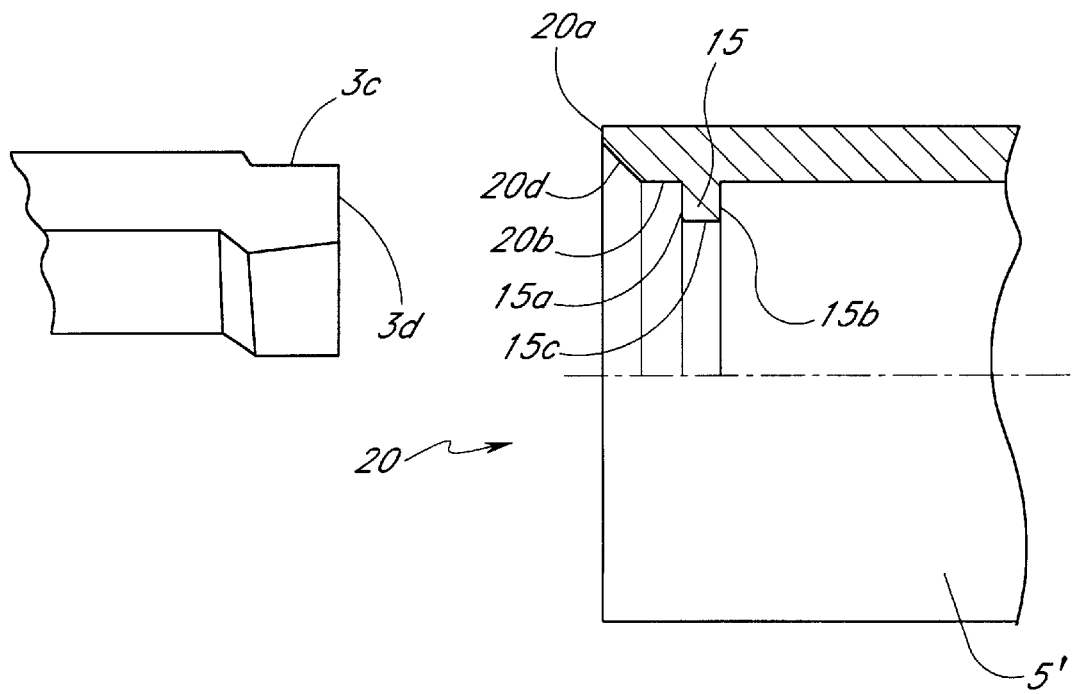
FIG. 10. A second embodiment form of a shell-shaped, outer fixing element.
Figure 11:
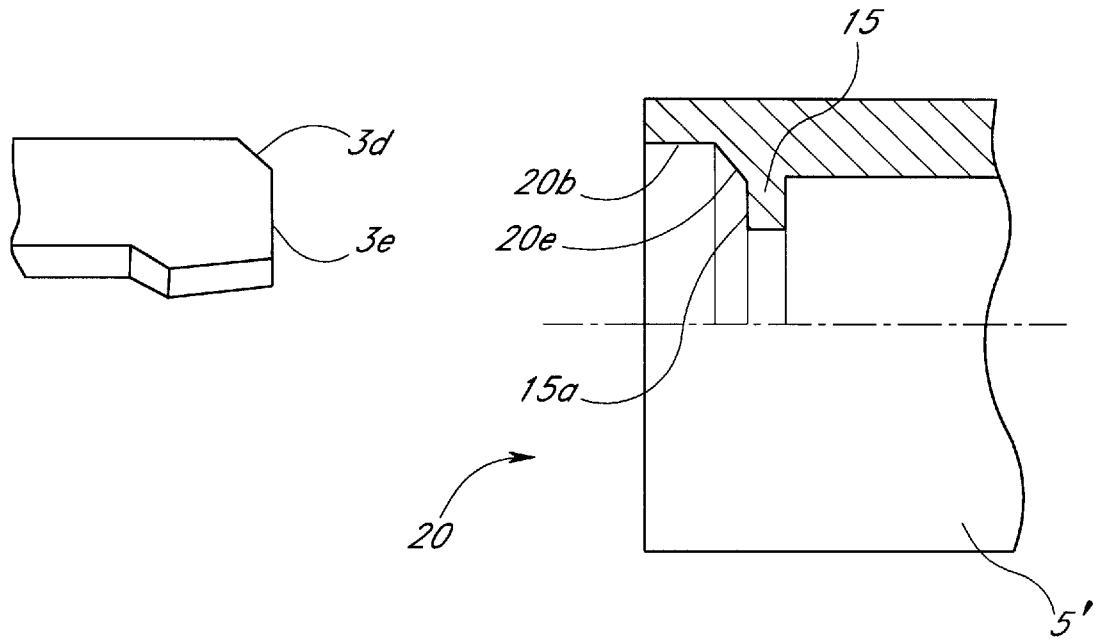
FIG. 11. A third embodiment form of a shell-shaped, outer fixing element.

FIGS. 10 and 11 show two further embodiment forms of the shell-shaped fixing element 5'. In FIG. 10 the fixing element 5' has a diagonal shape 20d on its front side, the stopping and receiving surface 15a, 20b, however being designed square once more. In FIG. 11, the fixing element 5' forms on its front side 20, in contrast, a diagonal stopping and receiving surface 15a, 20e, for an outer edge 3d, 3e, of the spring chucks 3. Both embodiment examples make possible a more flexible introduction of the spring chucks 3 into the tension piston 4 since the diagonal shape supports the introduction of the spring chucks 3 into the receiving means of the tension piston 4 in a central, sliding manner.

In all the embodiment forms of the fixing element 5', a sealing element 33 can be provided between the stopping step 15 and the tension piston 4, which is shown as an example here in FIG. 9a. In addition, an annular spring 34 can be arranged between the receiving surface 20b of the fixing element 5' and the spring chucks 3 in order to expand the latter radially for the connection to a fitting e.g. a connection nipple or pulling bolt of a steep taper cutter head (see FIG. 9a). This is especially necessary when the front part 3a of the spring chucks 3 is provided with an inner thread and when the fitting has an outer thread, which can only be brought into the engagement position with the spring chuck device when the spring chucks 3 have been expanded.

Furthermore, it may also be indicated here, that the shell-shaped fixing element 5' can also be moved by means of a mandrel in an axial direction relative to the spring chuck arrangement 3,4, out of engagement with the spring chucks 3. The mandrel, as shown already, is thereby conducted through the holes 11 which are formed by the spring chucks 3 (c.f. FIG. 8). A construction is also possible here once more, in which the fixing element 5' can be pulled away from the side of the right housing part 6 out of its stopping position with the spring chucks 3.

Figure 12:
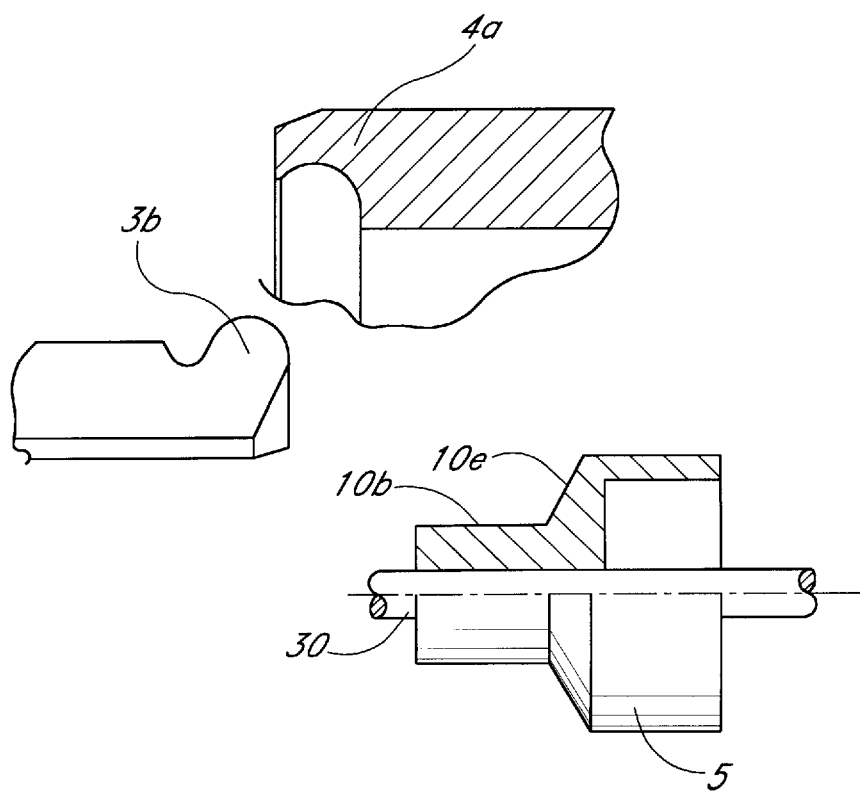
FIG. 12. A spring chuck device with a spherical hinge-shaped location of a spring chuck in a tension piston.

FIG. 12 shows a modified embodiment form of an arrangement of a rear part 3b of the spring chucks 3 in a front part of the tension piston 4. The front end 4a of the tension piston 4 has thereby an encompassing assembly groove, into which a complementary profile of the rear part 3b of the spring chucks 3 engages in an interlocking manner(c.f. FIGS. 1,2,7,9a). In FIG. 12, the front end 4a of the tension piston 4 has a spherical hinge-shaped filleting groove, the opening angle ° which is smaller than 180(in order to receive a complementary rear part 3b of the spring chucks 3. In its stopping position the fixing element thereby forms, with the filleting of the front part 4a of the spring chuck 3, an opening angle which is smaller than 180(and hence holds the spring chuck 3 in the tension piston 4 in an interlocking manner. In an embodiment of this type, clearance is not required between the spring chucks 3 and the tension piston 4, since a radial movement of the spring chucks 3 is guaranteed by spherical hinge-shaped bedding. This spherical hinge-shaped arrangement of the spring chucks 3 in the tension piston 4 can be used also by way of a mirror image in the embodiment forms with a shell-shaped fixing element 5'.

The embodiment of the fixing element 5', which are described above serve at the same time for the compensation of play also. In conventional hook-in connections, a narrow clearance is required between the spring chucks and the tension piston to prevent the spring chucks unhooking from the tension piston while, by virtue of using the fixing elements 5,5', according to the invention, a larger clearance is also possible between the spring chucks 3 and the tension piston 4. For this reason, traditional hook-in connections also only allow a small radial movement of the spring chucks 3, while, by using the fixing elements 5,5', a greater radial movement of the spring chucks 3 is possible, which facilitates the connection to a fitting in addition. Principally, the use of fixing elements 5,5' in a spring chuck device 3,4, according to the embodiment forms which are shown and described above, makes it possible to replace the spring chucks 3 easily and quickly without requiring to dismantle the housing with which the use of spring chuck devices of this type is facilitated in practice.

What is claimed is:

1. A spring chuck device, comprising:

a tension piston; and several spring chucks, the spring chucks each having a connection end and a bearing end, being secured detachably with their bearing ends to the tension piston and being axially adjustable together with the tension piston by means of an actuation element, wherein the tension piston and the spring chucks form a spring chuck arrangement which is coupled to a moveable fixing element relative to the spring chuck arrangement for catching the bearing ends in an interlocking manner, said fixing element having a front side.

2. The spring chuck device of claim 1, wherein the fixing element is axially adjustable.

3. The spring chuck device of claim 1, wherein the fixing element is actuated by means of a spring elastic element in a direction of a stopping position of the fixing element.

4. The spring chuck device of claim 1, wherein the fixing element is designed hat-shaped within the spring chuck arrangement.

5. The spring chuck device of claim 1, wherein the fixing element has a square stopping and receiving surface on its front side for an inner edge of the spring chucks.

6. The spring chuck device of claim 1, wherein the fixing element has a diagonal stopping and receiving surface on its front side for an inner edge of the spring chucks.

7. The spring chuck device of claim 1, wherein the fixing element has a square shape on its front side.

8. The spring chuck device of claim 1, wherein the fixing element has a diagonal shape on its front side.

9. The spring chuck device of claim 1, wherein the fixing element is designed shell-shaped with a hole extending in a radial direction.

10. The spring chuck device of claim 1, wherein a sealing element is provided between the fixing element and the tension piston.

11. The spring chuck device of claim 1, wherein the fixing element is designed shellshaped around the spring chuck device.

12. The spring chuck device of claim 1, wherein the fixing element is axially adjustable with a mandrel through the spring chuck arrangement.

13. The spring chuck device of claim 1, wherein the tension piston has a mounting groove into which the complementary profiled bearing ends of the spring chucks engage in an interlocking manner.

14. The spring chuck device of claim 1, wherein the front end of the tension piston has a spherical hinge-shaped filleting, the opening angle of which is smaller than 180° to receive the corresponding complementary profile of the bearing ends of the spring chucks and to fix them in an interlocking manner in the stopping position by means of the fixing element which together with the filleting of the front end of the tension piston forms an opening angle which is greater than 180°.

15. The spring chuck device of claim 3, wherein the fixing element has a collar on a rear side, said collar containing the spring elastic element.

16. The spring chuck device of claim 3, wherein the fixing element has an encompassing graduation on a rear side in order to arrange the spring elastic element between the fixing element and the tension piston.

17. The spring chuck device of claim 9, wherein a sealing element is provided between the fixing element and a guiding rod.

18. The spring chuck device of claim 11, wherein the fixing element has an encompassing stopping step directed inwards.

19. The spring chuck device of claim 11, wherein the fixing element has a square shape on its front side.

20. The spring chuck device of claim 11, wherein the fixing element has a diagonal shape on its front side.

21. The spring chuck device of claim 11, wherein the fixing element forms on the front side a square stopping and receiving surface for an outer edge of the spring chucks.

22. The spring chuck device of claim 11, wherein the fixing element forms on its front side a diagonal stopping and receiving surface for an outer edge of the spring chucks.

23. The spring chuck device of claim 11, wherein a sealing element is provided between the stopping surface and the tension piston.

24. The spring chuck device of claim 11, wherein an annular spring is provided between the fixing element and the spring chucks for radial expansion of the spring chucks.

25. The spring chuck device of claim 18, wherein the spring elastic element on the inner side of the fixing element is adjacent to a rear side of the stopping step.

26. A method for connecting couplings for a fluidic media, comprising the steps of:

providing a spring chuck device comprising a tension piston and several spring chucks;

securing the spring chucks at bearing ends to the tension piston;

releasably coupling a movable fixing element to the tension piston and the spring chucks, said fixing element catching the bearing ends in an interlocking manner; and axially adjusting the tension piston by means of an actuation element, so that the spring chucks at a connection end cause a change in a perimeter of the connection end.

27. The method of claim 26, further comprising the step of actuating the fixing element by means of a spring elastic element.

* * * * *